E. F. MITTCOVSBE.
CUTTING ATTACHMENT FOR RAKES.
APPLICATION FILED MAY 31, 1916.
1,213,230.  
Patented Jan. 23, 1917.
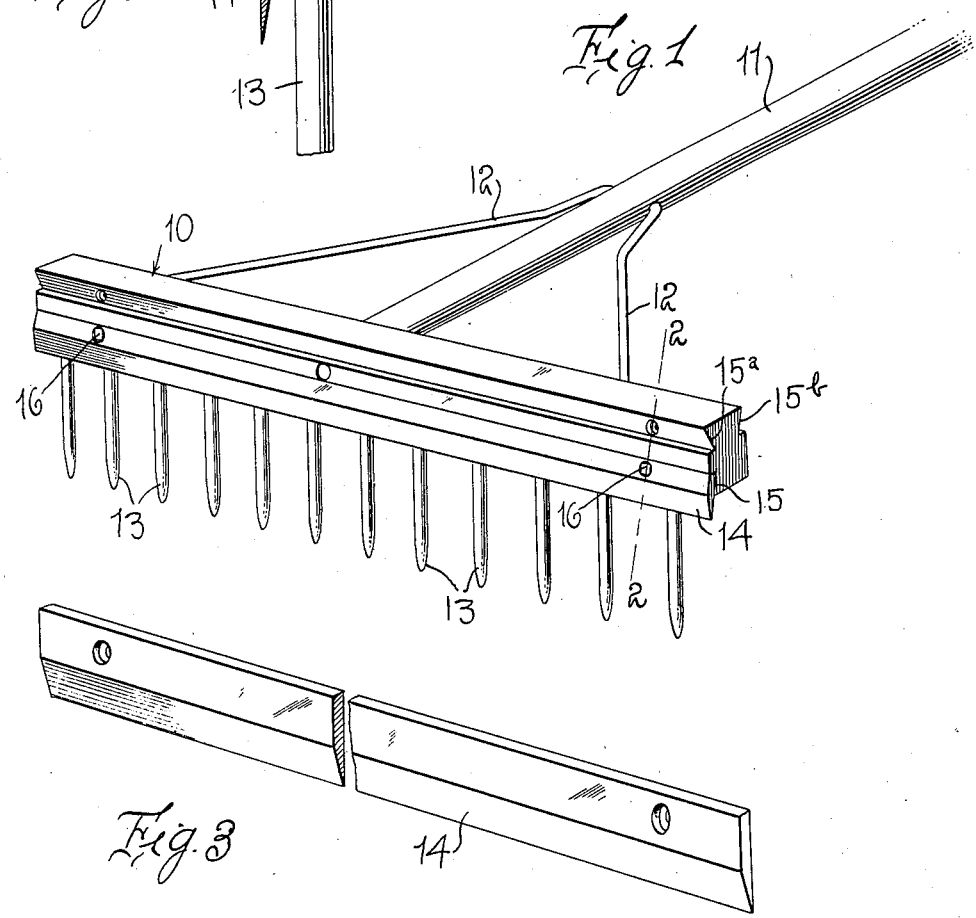
Inventor  
E. F. Mittcovsbe
By Watson E. Coleman  
Attorney

UNITED STATES PATENT OFFICE.

EDWARD F. MITTCOVSBE, OF PITTSBURGH, PENNSYLVANIA.

CUTTING ATTACHMENT FOR RAKES.

1,213,230.  Specification of Letters Patent.  Patented Jan. 23, 1917.

Application filed May 31, 1916. Serial No. 100,908.

*To all whom it may concern:*

Be it known that I, EDWARD F. MITTCOVSBE, a citizen of the United States, residing at Pittsburgh, in the county of Allegheny and State of Pennsylvania, have invented certain new and useful Improvements in Cutting Attachments for Rakes, of which the following is a specification, reference being had to the accompanying drawings.

This invention relates to rakes and particularly to a hay rake provided with a cutting knife thereon.

The general object of my invention is the provision, in connection with a rake such as a hay rake or garden rake, of a cutting knife so disposed that when it is in place the knife will cut off weeds, grass or grain which has been left standing after a mowing machine has passed.

A further object of the invention is the provision of a rake of this character in which the knife is detachably connected to the cross bar or body of the rake and is disposed in parallel relation to the teeth of the rake.

A further object of the invention is to so construct the cross bar of the rake that the cutting blade or knife will be applied in a number of different positions.

Other objects will appear in the course of the following description.

The invention is illustrated in the accompanying drawings in which:

Figure 1 is a perspective view of a rake constructed in accordance with my invention; Fig. 2 is a section on the line 2—2 of Fig. 1; and Fig. 3 is a perspective view of the blade detached from the rake head.

Referring to these drawings, 10 designates a cross bar or body of an ordinary hand rake and 11 designates the handle of the rake provided with the usual braces 12. The particular detailed construction of the body, the handle and the braces may be varied.

The body of the rake is provided with the usual teeth 13. These teeth are illustrated as being disposed along the medium plane of the body or cross bar 10. Attached to one face of the cross bar 10 is a cutting blade or knife 14 which has a length equal to that of the body 10 and extends in parallel relation to the series of teeth 13. Preferably, and for the reception of the knife, that face of the cross bar 10 which is directed away from the handle 11 is formed with a recess or pocket 15. This recess or pocket has an inclined rear wall as shown, so as to fit the knife which is approximately wedge shaped in cross section. Preferably the cross bar 10 is provided with a plurality of these knife receiving recesses and I have illustrated, for instance, the outer face of the cross bar, that is the face directed away from the handle, as being provided with the lower pocket or recess 15 and the upper pocket or recess 15ª and the rear face of the body or cross bar as being provided with an upper recess 15ᵇ. The blade or knife 14 may be disposed in any one of these recesses and is adapted to be held in place by bolts 16, the faces of the knife or blade being countersunk to receive the heads of the bolts and the opposite faces of the cross bar being countersunk to receive the nuts 17 of the bolts.

In use, when it is desired to use the rake for cutting, the rake is given a swinging movement in a circle so that the cutting edge of the blade or knife exerts a shearing cut on the weeds, grass, or grain. This combined cutter and rake is particularly designed for the purpose of raking and cutting any hay or grain that may be left standing after a mowing machine has cut over a field. In harvesting operations, after a mowing machine has passed over a field the hay or other crop is raked usually by means of a horse rake. Where there are stones, bushes or clumps of weeds, a considerable quantity of grain is left standing. This would ordinarily go to waste, particularly where the grain is mixed with the weeds. With this device, however, it is an easy matter to cut the grain and weeds and later separate the grain from the weeds.

This combined cutter and rake is also applicable to the construction of garden rakes and the cutter would act to a large extent as a weeder. In case there were any large weeds that could not be pulled out they could be cut off by my device so as not to hinder the growth of the plant. It will be obvious, of course, that used on a garden rake, the knife or cutter would have to be of a lighter type than that used on the hay rake as first described. By attaching the knife to the body of the rake by means of bolts, it is easy to remove the knife or cutter for resharpening.

It is obvious that this rake may be used in the usual and ordinary manner of a rake where it is not desired to cut. It is also obvious that by inclining the body of the rake to the line of cut, the knife would have a shearing action and weeds and other plants so cut would fall in front of the rake. By providing for various dispositions of the knife or cutter, it is possible to use the implement so that the cutter would act without the rake. It is obvious that the number of bolts 16 may be increased if the knife is of relatively light material.

Having described my invention, what I claim is:

1. The combination with a rake having a cross bar and rake teeth, of a cutting blade detachably disposed upon the outer face of the cross bar and extending entirely along the length thereof and parallel to the teeth, said blade projecting over the bases of the teeth but lying in a plane spaced from the plane of the teeth.

2. A rake comprising a handle, a cross bar, teeth projecting from the cross bar, the cross bar being provided on its outer face away from the handle with upper and lower longitudinally extending recesses forming pockets, and a blade detachably connected to the cross bar and extending parallel to the teeth, said blade being adapted to be disposed in either one of said recesses, the cutting edge of the blade projecting beyond the cross bar.

3. A rake comprising a handle, a cross bar, teeth projecting from the cross bar, the cross bar being provided on its outer face with upper and lower longitudinally extending recesses and upon its rear face with a longitudinally extending recess, and a cutting blade detachably mounted upon the handle and adapted to be disposed in any one of said recesses, and when so disposed extending parallel to the teeth of the rake.

In testimony whereof I hereunto affix my signature in the presence of two witnesses.

EDWARD F. MITTCOVSBE.

Witnesses:
CHAS. A. SCHLEICHER,
CHAS. A. KALINER.